Dec. 16, 1958 B. YELLIN 2,864,335
COLLAPSIBLE BIRD CAGE
Filed Nov. 15, 1956 3 Sheets-Sheet 1
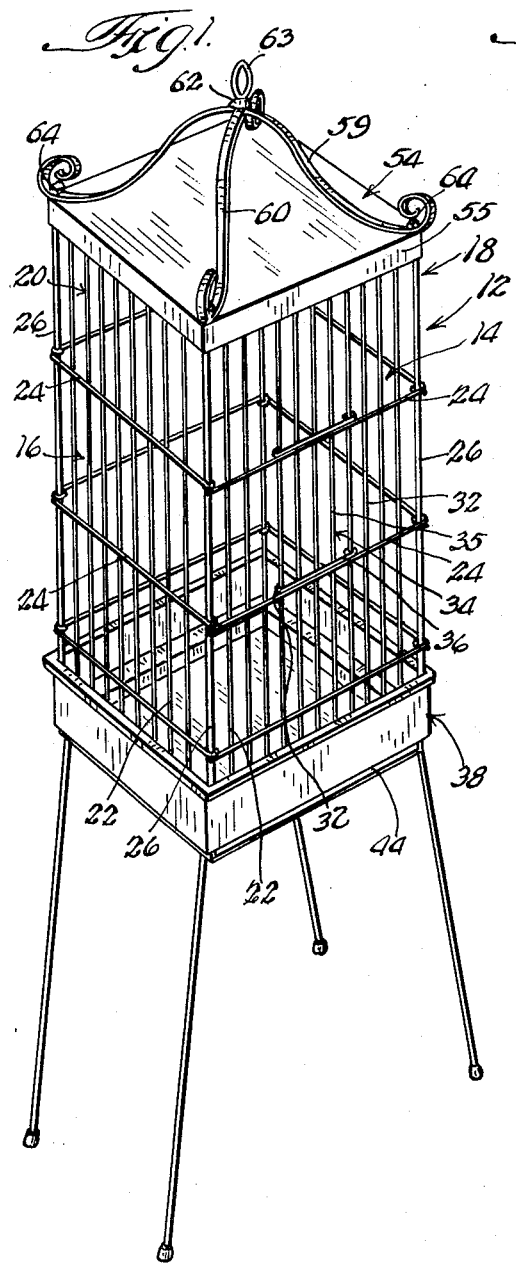
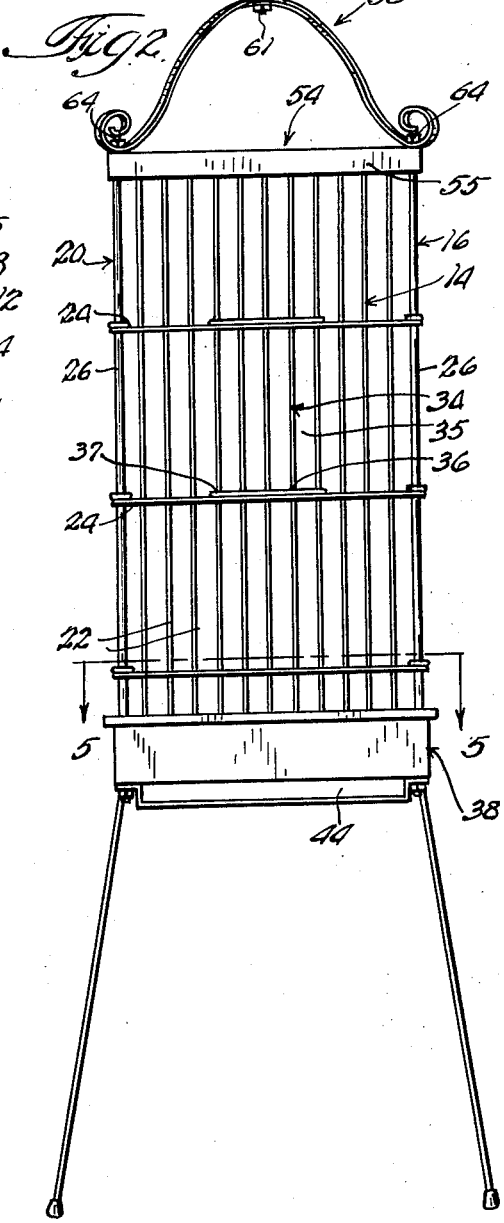
INVENTOR.
Bernard Yellin.
BY Max R. Kraus
Atty.

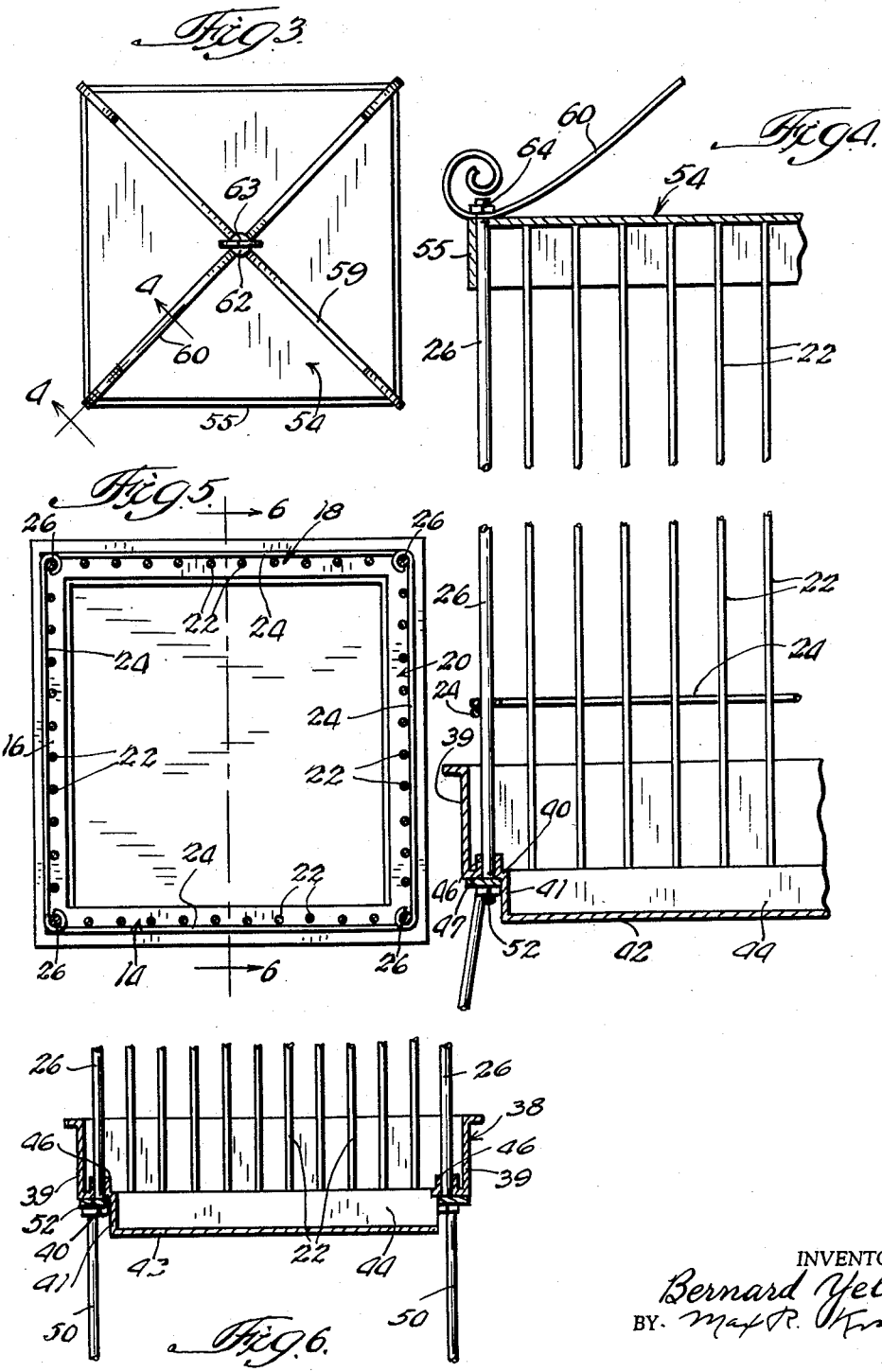

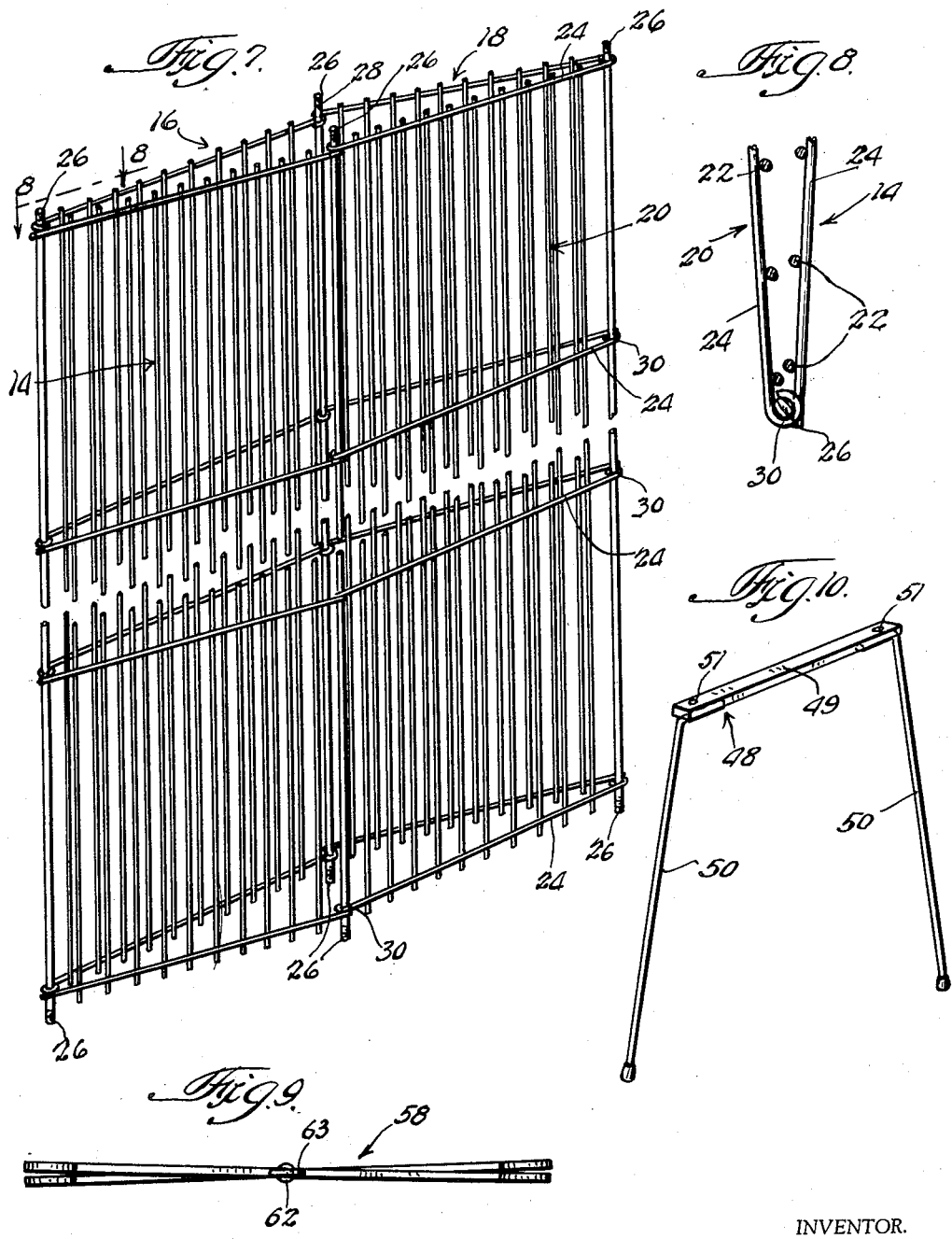

United States Patent Office 2,864,335
Patented Dec. 16, 1958

2,864,335

COLLAPSIBLE BIRD CAGE

Bernard Yellin, Chicago, Ill.

Application November 15, 1956, Serial No. 622,451

4 Claims. (Cl. 119—17)

This invention relates to a collapsible bird cage.

One of the objects of this invention is to provide a bird cage which may be readily collapsed to occupy a comparatively small space for shipment and/or storage and which may be readily setup to its fully expanded or setup position.

Another object is to provide a bird cage having an enlarged cage body supported on a stand which in its fully setup condition is of considerable size, yet which may be readily collapsed for shipment and storage to occupy a relatively small space and small cubic area in comparison to its fully setup position.

Another object of this invention is to provide a collapsible bird cage with a supporting stand, which is inexpensive to manufacture, which is attractive and ornamental in appearance and which is simple and easy to set up as well as collapse.

Other objects will become apparent as this description progresses.

In the drawings:

Fig. 1 is a perspective view of the cage in assembled setup position.

Fig. 2 is a front elevational view of same.

Fig. 3 is a top plan view.

Fig. 4 is an enlarged view taken on lines 4—4 of Fig. 3.

Fig. 5 is a view taken on lines 5—5 of Fig. 2.

Fig. 6 is a view taken on lines 6—6 of Fig. 5.

Fig. 7 is a perspective view of the cage in collapsed position.

Fig. 8 is a view taken on line 8—8 of Fig. 7.

Fig. 9 is a top view of the top fixture in collapsed position, and

Fig. 10 is a perspective view of one of the supporting members.

The cage body generally designated by the number 12 is formed of sections 14, 16, 18 and 20, which are open at the top and bottom ends.

Each of said sections is formed of spaced vertically extending bars 22 generally integrally connected to spaced, horizontally extending bars 24 and each section is formed as a separate integral unit. The two opposite sections 14 and 18 which may for purpose of identification be called the front and rear sections of the cage each have welded to each of the opposite ends of same a vertical end rod 26 which is longer than the height of the section so that the end rod extends above and below the top and bottom horizontal planes of the section. The opposite ends of each of the vertical end rods are threaded as at 28. The rods 26 have a larger circumference than the bars forming the section.

The two opposite sections 16 and 20 which may for purpose of identification be called the sides of the cage do not have end rods like those previously described, but the top, intermediate and bottom horizontal bars 24 thereof extend beyond the sides of the side sections and are curved around or hooked to form loops 30 which engage the end rods 26 to be secured therewith.

The loops 30 engaging the end rods 26 form permanent hinges joining the sections together and permit the cage body to be collapsed as shown in Fig. 7 in which the front section 14 is positioned adjacent the side section 16, and side section 20 is positioned adjacent rear section 18. The hinging connections permit the cage to be setup as shown in Figs. 1 and 2 in which the side sections 16 and 20 are positioned at right angles to the front and rear sections 14 and 16 to form a square cage in cross section.

The front section 14 is provided with an enlarged opening 32, which is closed by a slidable cage door 34. The cage door is formed of spaced vertical bars 35 secured together by horizontal bars 36 which have end loops 37 slidably engaging certain of the vertical bars 22 of the cage section.

The bottom of the cage is generally designated by the numeral 38 and comprises a square shaped pan like member having vertical sides 39, inwardly directed horizontal ledge portions 40, depending vertical sides 41 and a bottom wall 42. There is no depending vertical side 41 along the front of the pan like member to thus provide an elongated opening 44 through which a sheet of paper or the like may be inserted to cover the bottom wall 42 and which may likewise be removed through said opening.

The horizontal ledge portions 40 of the pan like member are provided with four sleeves 46 which may be integrally formed with said horizontal ledge portions and each of said sleeves is positioned adjacent the corners of the pan like member. Each sleeve communicates with an opening 47 in the ledge.

When the cage body is set up, the lower portion of the cage body is positioned in the pan member with the bottom of the cage body resting on the horizontal ledges 40 of the pan. The threaded ends 28 of the vertical rods 26 pass through the sleeves 46 and extend below the bottom of the ledges to be secured to the supporting members generally indicated at 48 which form the supporting stand.

The supporting member 48, best shown in Fig. 10, is formed of a horizontal strip 49 to which are integrally connected or otherwise fixedly secured leg rods 50. The leg rods 50 are inclined outwardly as shown and have rubber tips at the ends thereof. Openings 51 are provided in the strip for passage of the end rods 26 of the cage body. Two such supporting members are used to support the cage. Each of the supporting members is positioned so that the strip 49 rests underneath the horizontal ledge 40 along the sides of the cage and the threaded ends of the vertical rods 26 extend through the openings thereof as well as the openings 51 for engagement with threaded nuts 52 which secure the bottom pan like member 38 and supporting member 48 to the cage body 12. The bottom pan like member 38 will maintain the cage body 12 in its non-collapsed position. The upper open top of the cage body is covered by a cover member generally designated at 54 which is square shaped and has a downwardly extending flange 55 extending therearound. The cover member 54 has openings 56 adjacent the corners thereof which receive the upper threaded ends of the rods 26 and which extend upwardly thereof. While the cover 54 may be secured to the threaded ends of the rods by suitable nuts to complete the cage unit, I have provided principally for ornamental purposes a fixture unit generally designated by the numeral 58 which comprises a pair of curved bars 59 and 60 both of identical shape, which are swivelly joined together at the centers thereof by a threaded bolt 61 passing through an opening in each of the bars. A threaded knob 62 is secured to the threaded bolt and said knob has a ring 63 secured thereto whereby the entire cage may be manually lifted and moved about. The bars 59 and 60 have openings through which extend the upper ends of the vertical rods 26 and which are secured thereto by suitable nuts 64. It will thus be seen that the upper and lower open ends of the cage body are both enclosed and covered and that the upper cover 54 and the bottom pan shaped member 38 serves to maintain the cage body in its fully expanded or non-collapsed position. The fixture unit 58 may be collapsed by swivelling the bars 59 and 60 to the position shown in Fig. 9 in which they are in substantially longitudinal alignment so they occupy very little space when thus collapsed.

For shipping or storage purposes the cage body 12 is collapsed as shown in Fig. 7, as is the fixture unit 58 as shown in Fig. 9. The cover 54 and bottom pan-like member 38 may be stacked vertically against the collapsed cage body with the supporting members 48 so that very little space is occupied. In this manner the entire unit in disassembled condition may be packed for shipment or storage in a container of considerably smaller dimensions and less cubic area than would be necessary if the unit were shipped or stored in fully assembled or setup condition. The unit is relatively simple and easy to assemble and setup and this may be done by any unskilled person.

It will be understood that various changes and modifications may be made from the foregoing without departing from the spirit and scope of the appended claims.

I claim:

1. A collapsible bird cage comprising a cage body formed of four sections, each section formed of a plurality of spaced vertical bars connected by cross bars, two of said sections provided at their opposite ends with vertical end bars longer than the other intermediate bars, said end bars being threaded at the lower extremities thereof, the other two of said sections having the opposite ends of certain of its cross bars looped to engage the vertical end bars to provide a hinge connection between said four sections to permit collapsing of said cage body, a bottom pan-shaped member in which the bottom of said cage body is received, said bottom member having openings through which extend the lower extremities of said end bars, and threaded fastening members secured to the threaded extremities of said end bars to retain said bottom pan.

2. A collapsible bird cage comprising a cage body formed of four sections, each section formed of a plurality of spaced vertical bars connected by cross bars, two of said sections provided at their opposite ends with vertical end bars longer than the other intermediate bars, said end bars being threaded at the opposite extremities thereof, the other two of said sections having the opposite ends of certain of its cross bars looped to engage the vertical end bars to provide a hinge connection between said four sections to permit collapsing of said cage body, a bottom pan-shaped member in which the bottom of said cage body is received, said bottom member having openings through which extend the lower extremities of said end bars, threaded fastening members secured to said lower threaded extremities of said end bars to retain said bottom pan, a top pan-shaped cover having openings through which the upper extremities of said vertical bars extend and threaded fastening members secured to the upper threaded extremities of said end bars to retain said cover.

3. A collapsible bird cage comprising a cage body formed of four sections, each section formed of a plurality of spaced vertical bars connected by cross bars, two of said sections provided at their opposite ends with vertical end bars longer than the intermediate bars, said end bars being threaded at the lower extremities thereof, the other two of said sections having the opposite ends of certain of its cross bars looped to engage the vertical end bars to provide a hinge connection between said four sections to permit collapsing of said cage body, a bottom pan-shaped member in which the bottom of said cage body is received, said bottom member having openings through which said lower extremities extend, a pair of inverted U-shaped supporting members having openings engaged by the lower extremities of said vertical end bars, and threaded fastening members secured to the threaded extremities of said end bars.

4. A collapsible bird cage comprising a cage body formed of four sections, each section formed of a plurality of spaced vertical bars connected by cross bars, two of said sections provided at their opposite ends with vertical end bars longer than the intermediate bars, the other two of said sections having the opposite ends of certain of its cross bars looped to engage the vertical end bars to provide a hinge connection between said four sections to permit collapsing of said cage body, a bottom pan-shaped member in which the bottom of said cage is received, said bottom member having openings through which the lower ends of said vertical end bars extend, a pair of inverted U-shaped supporting members having openings engaged by the lower ends of said vertical end bars, fastening means secured to the lower ends of said end bars, a top pan-shaped cover adapted to fit over the top of the cage body when non-collapsed and having a downwardly extending flange extending around the upper portion of said cage body, said cover having openings through which the upper ends of said vertical bars extend and fastening means secured to the upper ends of said end bars to retain said cover.

References Cited in the file of this patent

UNITED STATES PATENTS

| | | |
|---|---|---|
| 702,993 | Pitts | June 24, 1902 |
| 1,200,557 | Whitmore | Oct. 10, 1916 |
| 1,227,814 | Maxwell | May 29, 1917 |
| 1,634,209 | Reiber | June 28, 1927 |
| 2,708,900 | Yellin | May 24, 1955 |